United States Patent Office 3,582,378
Patented June 1, 1971

3,582,378
PROCESSING PARTIALLY REHYDRATED
METAKAOLIN PIGMENT
Barry S. Miller, Roselle, N.J., assignor to Engelhard Minerals & Chemicals Corporation, Township of Woodbridge, N.J.
No Drawing. Filed May 14, 1968, Ser. No. 728,893
Int. Cl. C08h 17/06; C09c 1/42; C08f 45/06
U.S. Cl. 106—288Q
8 Claims

ABSTRACT OF THE DISCLOSURE

A synthetic anionic water-soluble organic polymeric electrolyte is employed as the dispersant for an adsorptive acidic hydrated aluminum silicate pigment obtained by calcining kaolin clay and then partially rehydrating the calcined clay. The aqueous pigment dispersion is employed in the preparation of coating compositions for applying to paper to make pressure-sensitive record material.

BACKGROUND OF THE INVENTION

It is known that kaolin clay can be converted to an adsorptive reactive hydrated aluminum silicate by calcining the naturally-occurring clay to obtain metakaolin, a substantially anhydrous aluminum silicate, and then heating the metakaolin in the presence of water under superatmospheric pressure until hydration occurs. Hydration is restricted so that the product contains less than the approximately 14% water of hydration or crystallization that can be restored to the metakaolin. Reference is made to U.S. 3,224,892 to Glen A. Hemstock.

It is also known that certain partially rehydrated metakaolin pigments are capable of taking part in a chromogenic reaction with various leuco dye material. The reactivity forms the basis of the suggested use of the pigments as a sensitive coating on receiving sheets for pressure-sensitive record material adapted to be printed with transferable leuco dyes such as oily mixture of crystal violet lactone and benzoyl leuco methylene blue. Reference is made to U.S. 3,223,546 and U.S. 3,226,252 to Glen A. Hemstock.

When pigments are coated on paper, it is conventional to prepare a fluid aqueous composition containing the pigment and pigment binder. The composition, frequently called a "coating color," is coated on paper which is then dried and calendered. Invariably a pigment dispersant is employed to obtain compositions having desired rheological properties and, in some cases, adequate solids.

Partially rehydrated metakaolin pigments are difficult to disperse in aqueous liquids. Heretofore, the dispersants employed in conventional paper coating compositions have been used when preparing coating compositions containing the partially rehydrated metakaolin pigments. These dispersants include sodium silicate and sodium condensed phosphates, especially mixtures of these compounds. See U.S. 3,223,546 and U.S. 3,226,252 (supra). Such dispersants are the same as those employed in preparing commercial receiving sheets for pressure-sensitive record material which contain attapulgite clay as the sensitive pigment. Note the ingredients of the attapulgite coating compositions described in U.S. 2,699,432 to Marra et al.

The rheological properties of aqueous coating compositions containing partially rehydrated metakaolin pigments leave much to be desired when sodium silicate and/or sodium condensed phosphates are used to disperse the pigments. Further, when used in dispersant-effective quantity, the resulting coated sheets do not possess the sensitivity that is desired.

THE INVENTION

An object of this invention is to provide an improved means for dispersing rehydrated metakaolin pigments in water. Another object is to disperse such pigments in water without introducing compounds which impair substantially the sensitivity of the color developing pigments towards leuco dyes.

Stated briefly, in accordance with this invention, an adsorptive, acidic hydrated aluminum silicate pigment obtained by partial rehydration of metakaolin is dispersed in water in the presence of a small amount of a synthetic organic anionic water-soluble polymeric polyelectrolyte.

It has been found that organic polymeric polyelectrolytes are eminently more effective than inorganic polymers (i.e., sodium silicate or sodium condensed phosphates) as dispersants for these specific adsorptive acidic pigments.

Further, certain organic polymeric polyelectrolytes have little if any adverse effect on the dye sensitivity of the partially rehydrated metakaolin pigments when used in dispersant-effective proportions. In marked contrast, sodium silicate and sodium condensed phosphates have a very detrimental effect on the sensitivity of receiving sheets pigmented with the adsorptive partially rehydrated metakaolin pigments when these dispersants are employed in quantity sufficient to obtain coating compositions of desired solids content and rheological properties.

In accordance with a preferred embodiment of this invention, the organic anionic polymeric polyelectrolyte is used with ammonia to disperse partially rehydrated metakaolin pigments in water. The ammonia is employed in amount sufficient to impart an alkaline pH to the coating composition (preferably a pH within the range of about 8.5 to 9.5).

When certain organic polymeric polyelectrolytes are employed in combination with ammonia, higher solids coating compositions may be obtained than when the ammonia or organic polymeric polyelectrolytes are employed alone. Further, ammonia has a very desirable effect on the sensitivity of the pigments towards leuco dyes such as crystal violet lactone and benzoyl leuco methylene blue. This effect is not reduced significantly by the presence of certain organic polyelectrolytes. The use of ammonia to disperse rehydrated metakaolin pigments and to improve their sensitivity characteristics is disclosed and claimed in my copending application Ser. No. 723,602, filed Apr. 23, 1968.

DESCRIPTION

The preferred water-soluble organic polymeric polyelectrolyte that is employed in carrying out this invention is a sodium salt of a naphthalene sulfonate-formaldehyde condensate. Generally speaking, these condensates have approximate molecular weights within the range of $1 \times 10^3$ to $3 \times 10^3$. High molecular weight grades of salts of naphthalene sulfonate-formaldehyde condensates, e.g., products supplied with an approximate molecular weight of 1700 are preferred to lower molecular weight products, e.g., products having an approximate molecular weight of about 900. Also suitable are sodium salts of alkylated aromatic sulfonic acid-formaldehyde condensation products, exemplified by sodium diisopropyl-naphthalene sulfonate-formaldehyde which is described in U.S. 1,696,199.

It is also within the scope of the invention to employ synthetic water-soluble anionic polymeric polyelectrolytes which have a substantially linear continuous carbon chain derived by the polymerization of aliphatically unsaturated hydrocarbon groups. Examples of water-soluble organic polyelectrolytes derived substantially completely by olefinic polymerization are hydrolyzed polymers of methacrylonitrile, salts of hydrolyzed polymers of methacrylonitrile, copolymers of unsaturated polycarboxylic acids and at least one other mono-olefinically unsaturated monomer, salts of copolymers of unsaturated polycarboxylic acids and at least one other mono-olefinically unsaturated monomer, copolymers of unsaturated polycarboxylic acids and at least one other mono-olefinic monomer, salts of hydrolyzed copolymers of unsaturated polycarboxylic acid anhydrides and at least one other mono-olefinic monomer, hydrolyzed copolymers of unsaturated polycarboxylic acid anhydrides and at least one other mono-olefinic monomer, salts of copolymers of the partial alkyl esters of unsaturated polycarboxylic acids and at least one other mono-olefinic monomer, copolymers of unsaturated dicarboxylic acid anhydrides and at least one other mono-olefinic monomer, copolymers of the partial alkyl esters of unsturated polycarboxylic acids and at least one other mono-olefinic monomer, salts of sulfonated polymers of hydrocarbons containing aliphatic unsaturation, sulfonated polymers of hydrocarbons containing aliphatic unsaturation, and polymers of amides containing aliphatic unsaturation. Species of polyelectrolyte polymers and typical preparations are set forth in U.S. 2,625,529 to Mowry et al.

The polymeric organic dispersant is employed in amount sufficient to prevent flocculation of the pigment in water. The quantity is usually within the range of about 0.1% to 2%, usually 0.2% to 1%, based on the dry weight of the pigment. Optimum proportion will depend upon the species of polyelectrolyte that is employed and may be determined by routine experimentation. When too little polymer is employed, the pigment may be inadequately dispersed (deflocculated) and/or aqueous coating compositions of the desired solids level may not be obtained. When too much polymer is used, undesirable flocculation may occur.

The finely divided partially rehydrated metakaolin pigments have pH values within the range of about 4 to 6. (The pH values refer to those obtained by slurrying the pigment in distilled water at 20% weight solids and testing the pH of the slurry at 25° C.) They also have acid sites of sufficient strength to change the leuco form of crystal violet lactone to blue form. The pigments have surface areas (B.E.T.) within the range of about 50 m.$^2$/g. to 300 m.$^2$/g. In some cases, products with higher surface areas are obtained. All surface area values mentioned herein refer to values obtained by a nitrogen absorption method described by S. Brunauer, P. H. Emmett and E. Teller in an article entitled "Adsorption of Gases in Multi-Molecular Layers," page 309 of Journal of the American Chemical Society, vol. 60, February 1938, using the molecular size data of H. K. Livingston presented in his article entitled "Cross-Sectional Areas of Molecules Adsorbed on Solid Surfaces," page 569, Journal of the American Chemical Society, vol. 66, April 1944.

The pigment particles should be essentially finer than 20 microns, preferably finer than 5 microns.

To obtain a partially rehydrated metakaolin pigment, an aqueous slip of metakaolin (a form of calcined anhydrous kaolin clay) is heated under super-atmospheric pressure until the product has a water of hydration (crystallization) within the range of about 4% to 13% by weight. Since high purity kaolin clays contain about 14% water of hydration when fully hydrated, these hydrated aluminum silicates are referred to as "partially rehydrated metakaolins." (The terms "metakaolin" and "water of crystallization" are defined in U.S. 3,224,892 to Hemstock.) The metakaolin employed in the preparation of partially rehydrated metakaolin pigments may be obtained from kaolinite, halloysite, anauxite, nacrite or mixtures thereof. Saturated steam pressures of about 400 to 1000 p.s.i.g. may be used in producing the partially rehydrated metakaolin pigments although higher or somewhat lower pressures may be employed.

When preparing partially rehydrated metakaolin pigments for use in pressure-sensitive printing, the metakaolin reactant should be free from conventional inorganic clay dispersants (sodium silicate, sodium condensed phosphates). Other ingredients may be present with the metakaolin during the hydrothermal treatment.

Also within the scope of this invention are anhydrous aluminum silicate pigments obtained by calcining partially rehydrated metakaolin pigments containing about 4% to 13% water of crystallization at temperatures ranging from 300° C. to 1200° C., preferably 900° C. to 1100° C. See U.S. 3,226,252 to Hemstock. Calcination has a desirable effect on pigment viscosity. Moreover, calcined rehydrated metakaolin pigments, especially those calcined at temperatures within the range of 900° C. to 1100° C. tend to produce nonfading images.

Coating color compositions of the present invention contain the following as essential ingredients: water, partially rehydrated metakaolin pigment, adhesive in binder-effective quantity and water-soluble polymeric organic polyelectrolyte in dispersant-effective quantity.

Incorporation of a suitable quantity of polymer results in a distinct thinning or fluidization of the composition when it is adde dbefore the adhesive suspension is incorporated. The polymeric polyelectrolyte may be incorporated with the other ingredients of the coating composition at any point prior to the addition of the adhesive. When it is desirable to obtain a composition having a higher solids level than can be obtained without the polyelectrolyte, the polyelectrolyte should be dissolved in water and the pigment added to the solution of the polymer with agitation. The pigment dispersion is then incorporated with the aqueous adhesive system.

Coating colors containing up to about 45% solids may be obtained by dispersing the partially rehydrated metakaolin pigments in a solution of a suitable synthetic organic polymeric polyelectrolyte and mixing the dispersion with a suitable binder dispersion. Higher solids coating colors, up to about 55%, may be obtained by incorporating ammonia hydroxide in the solution of the polymer and dispersing the pigment in the resulting solution. The maximum solids level will of course vary with the coating technique that is employed to apply the composition to the sheet material.

Preferred binders are substantially neutral synthetic latexes, especially acrylic resin latexes. Other suitable latexes include styrene-butadiene and polyvinyl acetate. Starch binders may be employed alone or in combination with compatible latex. Preferably, casein, which has a very detrimental effect on sensitivity, is avoided. Binder is usually used in amount within the range of 5% to 20% of the pigment weight (on a dry binder and pigment weight basis).

Sodium silicate and tetrasodium pyrophosphate are preferably absent from the coating composition. As mentioned above, these are the dispersants that are used to prepare attapulgite coated receiving sheets. When used in amount sufficient to have a dispersant effect on pigments such as rehydrated metakaolin, sodium silicate and tetrasodium pyrophosphate tend to have a very adverse effect on the sensitivity of the coated receiving sheets. Moreover, tetrasodium pyrophosphate, which is an extremely effective dispersant for attapulgite, is a poor dispersant for partially rehydrated metakaolin pigments.

EXAMPLE

In the example which follows, sheets of paper raw stock were coated with sufficient coating composition to produce a coat weight of 5 lb./3000 square feet. Coating was in the machine direction on the felt side. The sheets were calendered and air dried immediately after being coated. The dried sheets were cut into strips on a 6″ x 10″ die and placed in a photoprint dryer at about 200° F. with the coated side out for 3 minutes.

The dried sheets were immediately transferred to individual sealed polyethylene bags which were stored in a closed drawer in the room maintained at a substantially constant temperature of 73° F. and 50% R.H.

Quantitative evaluations of the sensitivity of the pigment-coated receiving sheets towards a mixture of crystal violet lactone and benzoyl leucomethylene blue were made as follows. A commercial sheet of printing paper coated in all directions with a microencapsulated solution of crystal violet lactone and benzoyl leucomethylene blue in chlorinated diphenyl oils was placed in face-to-face relationship with the coating on the pigment-coated receiving sheet. While the two sheets were in contact, they were passed through a calender under pressure sufficient to rupture the capsules on the transfer sheet, liberate the solution of dyes and form a printed image on the pigment-containing receiving sheet.

Sensitivity was determined by contrasting the printed and unprinted areas of the calendered sheets. The sensitivity testing involved separately determining the reflectances of the printed area and the reflectance of the background with a Bausch and Lomb Opacimeter with a green filter (572 m$\mu$ peak). A "calender intensity" value was then calculated in accordance with the following equation:

Percent calender intensity =
$$\frac{\text{average reflectance of printed area}}{\text{average reflectance of background}} \times 100$$

A low calender intensity value therefore indicates a high contrast ratio of printed to background and represents a sharp printed image. A high calender intensity value represents a low contrast ratio.

The following tests were carried out to demonstrate several advantages of using water-soluble polymeric polyelectrolyte dispersants for high solids coating colors containing a partially rehydrated metakaolin pigment. The results of these tests also point out advantages of using the organic polymers instead of conventional inorganic dispersants, i.e., sodium silicate and tetrasodium pyrophosphate.

A sensitive, partially rehydrated metakaolin pigment was prepared by heating a 20% solids slip of metakaolin in water to 500 p.s.i.g. for 3 hours. The acidic pigment had a surface area of 102 m.²/g. and contained 7.14% water of crystallization.

Tests were carried out to determine the maximum solids content of coating colors that could be obtained with the pigment when it was employed with various dispersants. Similar tests were carried out without using any dispersant with the pigment. In making these tests, Hercules rheograms were obtained and the results were used in a conventional manner as the criterion to ascertain maximum solids and optimum dispersant proportions.

The basic coating color formulation was: pigment 100.0 parts by weight; "UCAR Latex 40" (46% solids), 15.0 parts by weight; and water to prepare the formulation to maximum percent solids. In all cases, the paper was provided with a 5 lb./ream coat weight.

In a test carried out without any dispersant, the pigment was mixed with water and the suspension was mixed with the 46% solids neutral acrylic latex, using 15.0 parts latex solids to 100.0 parts pigment. The maximum solid coating color obtained without a dispersant was 36%. Viscosity (Brookfield at 20 r.p.m.) was 20,000 cps.

In a test carried out with ammonia as the sole dispersant, the pigment was dispersed in an aqueous solution of ammonia (pH 9), and the dispersion was mixed with the 46% solids latex, again using 15.0 parts latex to 100.0 parts pigment. In this case a 45% solids coating color was prepared.

When an anionic organic dispersant ("Lomar D") was added to the water after ammonia was added and before incorporating pigment, a 50% solids coating color having a Brookfield viscosity (20 r.p.m.) of only 3000 cps. was obtained. The dispersant was a sodium salt of a naphthalene sulfonate-formaldehyde condensate having an approximate molecular weight of 1700 and a salt content of 9.2%. The "Lomar D" was employed in amount of 0.8% of the pigment weight.

Using the same quantity of another synthetic anionic polymeric polyelectrolyte, "Gensperse," with ammonia in the same manner, a 50% solids coating color having a Brookfield viscosity of 5000 cps. was obtained. "Gensperse" is the trade name of an aqueous solution of the sodium salt of polyacrylic acid containing 40% solids (w./w.) and having a pH of 7.0-7.5.

To compare the effect of polymeric polyelectrolyte dispersants with the effect of inorganic polymeric dispersants, coating colors were prepared with various proportions of tetrasodium pyrophosphate and sodium silicate dispersants. Coatings color containing maximum solids and optimum proportions of sodium silicate were prepared at the same pigment-binder ratio used when preparing the compositions containing organic polyelectrolyte dispersants. The apparent viscosity of the resulting coating composition were similar to those using "Lomar D" or "Gensperse."

Coating colors containing maximum solids and optimum amounts of dispersant (a combination of ammonia and organic dispersant, sodium silicate and tetrasodium pyrophosphate) were applied to paper (5 lb. coat weight). The coated sheets were dried, calendered and tested for sensitivity, as described above. For purposes of comparison, the 36% solids coating color without a dispersant and the 45% solids composition with ammonia as the sole dispersant were applied to paper and tested for sensitivity in the same manner. Results are summarized in the table below.

TABLE.—EFFECT OF DISPERSANT ON RHEOLOGY OF COATING COMPOSITIONS AND SHEET SENSITIVITY—PARTIALLY REHYDRATED METAKAOLIN PIGMENT

| Dispersant | Coating composition | | Sheet sensitivity, percent calender intensity for— | |
|---|---|---|---|---|
| | Percent solids | Brookfield viscosity (20 r.p.m.) | 30 sec. | 48 hr. |
| None (control) | 36 | 20,000 | 41 | 37 |
| Ammonia | 45 | 3,000 | 39 | 37 |
| Tetrasodium pyrophosphate | 41 | 4,000 | 48 | 47 |
| Sodium silicate | 43 | 4,000 | 50 | 49 |
| "Lomar D" and ammonia | 50 | 3,000 | 41 | 37 |
| "Gensperse" and ammonia | 50 | 5,000 | 45 | 41 |

The data in the table show that higher solids could be obtained using organic polymeric polyelectrolytes at a pH adjusted to 9 with ammonia than could be obtained with the ammonia alone or with sodium silicate or tetrasodium pyrophosphate. Thus, by using organic polyelectrolytes, 50% solids coating color could be prepared whereas using sodium silicate or tetrasodium pyrophosphate, 41% and 43% solids colors were obtained.

The data in the table on sheet sensitivity show that ammonia had a desirable effect on sensitivity, especially 30 second sensitivity, as compared to the sensitivity of the sheet prepared without dispersant. The data show that when "Lomar D" was used as a dispersant with ammonia to adjust pH to 9, the sheet had substantially the same sensitivity as the control, thus demonstrating that "Lomar D" did not have an adverse effect on sensitivity and did not impair the effectiveness of ammonia in improving sensitivity. "Gensperse" resulted in a modest decrease in 30 second sensitivity and 48 hour sensitivity as compared to the control sheet and the sheet in which ammonia was used as the sole dispersant. In contrast, tetrasodium pyrophosphate and sodium silicate had an adverse effect on 30 second sensitivity and even a worse effect on 48 hour sensitivity.

These data therefore indicate that the organic polymeric polyelectrolytes were superior to sodium silicate and tetrasodium pyrophosphate as dispersants for a partially rehydrated metakaolin pigment and had a much less adverse effect on sheet sensitivity.

Further experimentation indicated that "Lomar D" was slightly superior with respect to dispersing action and sheet sensitivity to a lower molecular grade of sodium naphthalene-formaldehyde condensate containing less than 3% salt and reported to have an approximate molecular weight of 900.

Also, it was found that when "Lomar D" was used without ammonia, colors containing about 5% less solids could be prepared. Sensitivity tests indicate that these colors may be expected to result in sheets which are generally about 2 to 3 points higher in 30 second and 48 hour sensitivity than when ammonia was used with the "Lomar D." Such sheets, however, have significantly lower sensitivity values than sheets obtained with sodium silicate or sodium condensed phosphate dispersants.

I claim:

1. A method for producing an aqueous dispersion of an adsorptive acidic hydrated aluminum silicate pigment obtained by partially rehydrating metakaolin which comprises agitating said pigment in water in the presence of a water-soluble anionic organic polymeric polyelectrolyte in amount sufficient to disperse said pigment in said water.

2. The method of claim 1 wherein said polyelectrolyte is a salt of polymerized naphthalene sulfonate-formaldehyde condensate.

3. The method of claim 2 wherein said polyelectrolyte is a sodium salt and has an approximate molecular weight within the range of about $1 \times 10^3$ to $3 \times 10^3$.

4. The method of claim 1 wherein said polyelectrolyte is a sodium salt of polyacrylic acid.

5. The method of claim 1 wherein said water in which said pigment is dispersed also contains ammonia.

6. A composition for applying to paper to provide a coating thereon which comprises water, acidic partially rehydrated metakaolin pigment having a B.E.T. surface area in excess of 50 m.$^2$/g., a dispersant-effective quantity of a water-soluble anionic organic polymeric polyelectrolyte and a substantially neutral latex adhesive.

7. The composition of claim 6 wherein said polymeric polyelectrolyte is a sodium salt of a naphthalene sulfonate-formaldehyde condensate.

8. The composition of claim 7 wherein said condensate has an approximate molecular weight of 1700 and is employed in amount within the range of about 0.1% to 2% based on the weight of said pigment.

References Cited

UNITED STATES PATENTS

| | | | |
|---|---|---|---|
| 2,790,735 | 4/1957 | McLaughlin et al. | 117—155 |
| 3,104,068 | 9/1963 | Castelli et al. | 241—16 |
| 3,226,252 | 12/1965 | Hemstock | 117—155 |
| 3,442,684 | 5/1969 | Woodham et al. | 117—64 |

TOBIAS E. LEVOW, Primary Examiner

J. V. HOWARD, Assistant Examiner

U.S. Cl. X.R.

106—308Q, 309; 117—154; 260—29.6, 41A